United States Patent
Balasubramanian et al.

(10) Patent No.: US 12,483,887 B2
(45) Date of Patent: Nov. 25, 2025

(54) SECURE TIMING FOR SIDELINK SYSTEMS

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 17/934,468

(22) Filed: Sep. 22, 2022

(65) Prior Publication Data
US 2024/0107308 A1    Mar. 28, 2024

(51) Int. Cl.
*H04W 12/06* (2021.01)
(52) U.S. Cl.
CPC ................. *H04W 12/068* (2021.01)
(58) Field of Classification Search
None
See application file for complete search history.

(56) References Cited

U.S. PATENT DOCUMENTS

| | | | |
|---|---|---|---|
| 8,260,259 B2* | 9/2012 | Semple | H04W 12/068 |
| | | | 713/168 |
| 11,950,099 B2* | 4/2024 | Balasubramanian | |
| | | | H04W 12/02 |
| 12,317,121 B2* | 5/2025 | Baek | H04W 28/0263 |
| 2020/0015079 A1* | 1/2020 | Li | H04W 8/08 |
| 2020/0252398 A1* | 8/2020 | Targali | H04W 12/041 |
| 2020/0288320 A1* | 9/2020 | Kunz | H04W 12/02 |
| 2023/0199494 A1* | 6/2023 | Balasubramanian | |
| | | | H04W 12/106 |
| | | | 455/411 |
| 2024/0107308 A1* | 3/2024 | Balasubramanian | |
| | | | H04W 12/068 |

FOREIGN PATENT DOCUMENTS

EP    4005338 B1 *   9/2024   ........... H04L 5/0053

* cited by examiner

*Primary Examiner* — Ponnoreay Pich
(74) *Attorney, Agent, or Firm* — Patterson + Sheridan, L.L.P.

(57) ABSTRACT

Certain aspects of the present disclosure provide a method for wireless communications by a transmitter user equipment (UE). The transmitter UE generates a message authentication code, based on information within a sidelink master information block (SL-MIB) and a key shared between the transmitter UE and a receiver UE. The transmitter UE transmits a sidelink broadcast channel (SL-BCH) transmission carrying the SL-MIB and the message authentication code.

15 Claims, 17 Drawing Sheets

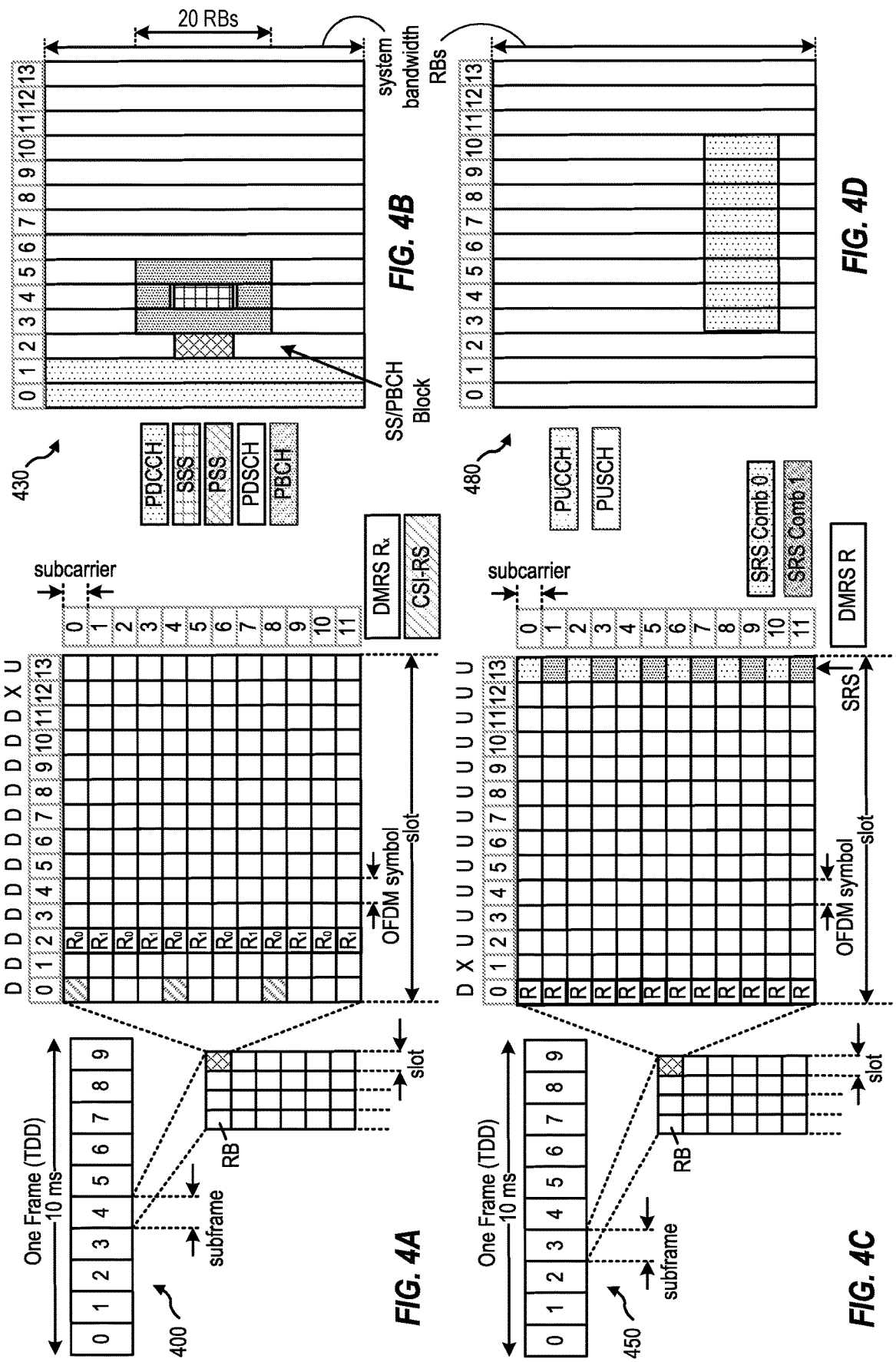

SECURE TIMING FOR SIDELINK SYSTEMS

BACKGROUND

Field of the Disclosure

Aspects of the present disclosure relate to wireless communications, and more particularly, to techniques for determining timing authenticity in a sidelink system.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a transmitter user equipment (UE), comprising: generating a message authentication code, based on information within a sidelink master information block (SL-MIB) and a key shared between the transmitter UE and a receiver UE; and transmitting a sidelink broadcast channel (SL-BCH) transmission carrying the SL-MIB and the message authentication code.

Another aspect provides a method for wireless communications by a receiver UE, comprising: receiving a SL-BCH transmission carrying a SL-MIB and a message authentication code from a transmitter UE; generating another message authentication code based on information within the SL-MIB and a key shared between the transmitter UE and the receiver UE; and authenticating the received SL-BCH transmission, based on matching of the generated message authentication code and the received message authentication code.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
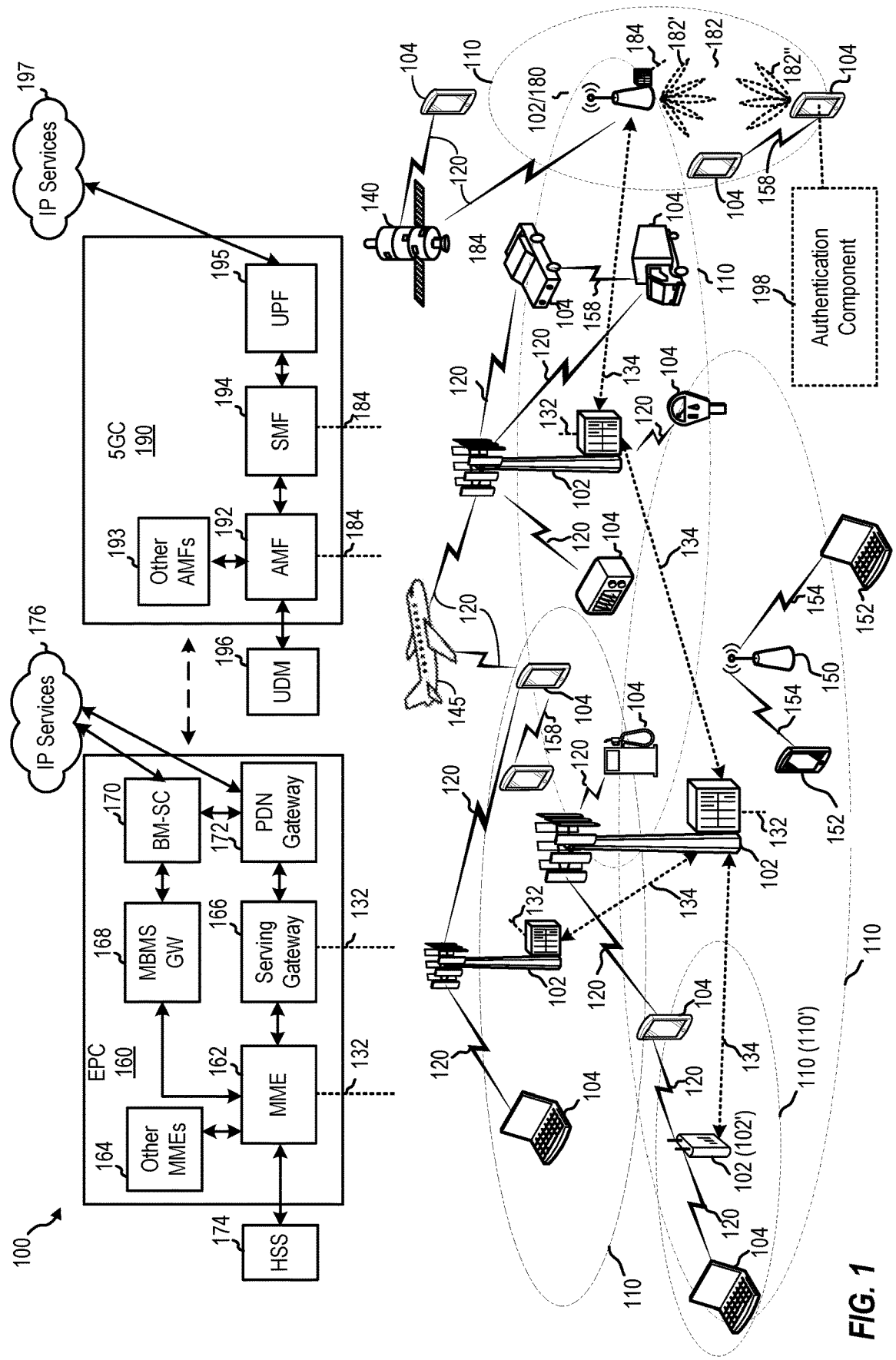
FIG. 1 depicts an example wireless communications network.

Aspects of the present disclosure provide apparatuses, methods, processing systems, and computer-readable mediums for determining timing authenticity in a sidelink system.

In current new radio (NR) vehicle-to-everything (V2X) systems, a synchronization procedure (e.g., to acquire frequency and time synchronization) for user equipments (UEs) is performed under the assumption that all the UEs are legitimate. For example, multiple UEs (e.g., UE1, UE2, UE3, and UE4) may be part of a legitimate group. In this group, UE1 may be a transmitter UE and other UEs may be receiver UEs. UE1 transmits a sidelink synchronization signal block (S-SSB) towards the other UEs. The other UEs derive their timing, based on the received S-SSB from UE1.

However, when an attacker UE-a is present, UE-a may also transmit the S-SSB towards these UEs (e.g., to split the group). In such cases, one or more UEs of the group (e.g., UE2 which may be closer to UE-a than UE1) may derive the timing from the S-SSB received from UE-a and not from UE1. So, UE-a is able to mislead UE2 to derive the timing from UE-a. In this case, UE2 will be unable to decode V2X signals from the other UEs in the group, based on the derived timing from UE-a which is not part of the group, and thereby jeopardizes its operation and safety. Accordingly, there is a need to determine the authenticity of the derived timing.

Techniques proposed herein support determining the authenticity of the derived timing in the sidelink system. For example, the transmitter UE transmitting the S-SSB, via a sidelink broadcast channel (SL-BCH) transmission, provides a first message authentication code along with the S-SSB, to allow a receiver UE receiving the SL-BCH transmission verify the authenticity of the SL-BCH transmission content. The transmitter UE generates the first message authentication code, based on a shared key (e.g., shared with the receiver UE) and data contained in the SL-BCH transmission. The receiver UE derives the timing from the transmitter UE based on the received SL-BCH transmission, and decodes the data contained in the SL-BCH transmission. The receiver UE uses the decoded data along with the shared key to generate a second message authentication code. The receiver UE authenticates the received SL-BCH transmission and the derived timing, when the first message authentication code is same as the second message authentication code. However, when the first message authentication code is different from the second message authentication code, the receiver UE disregards the derived timing and moves on to look for alternate timing derivation from another UE.

The techniques proposed herein provide enhanced security in the sidelink system by preventing attacker UEs from jeopardizing operation and safety of legitimate UEs operating in the sidelink system.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
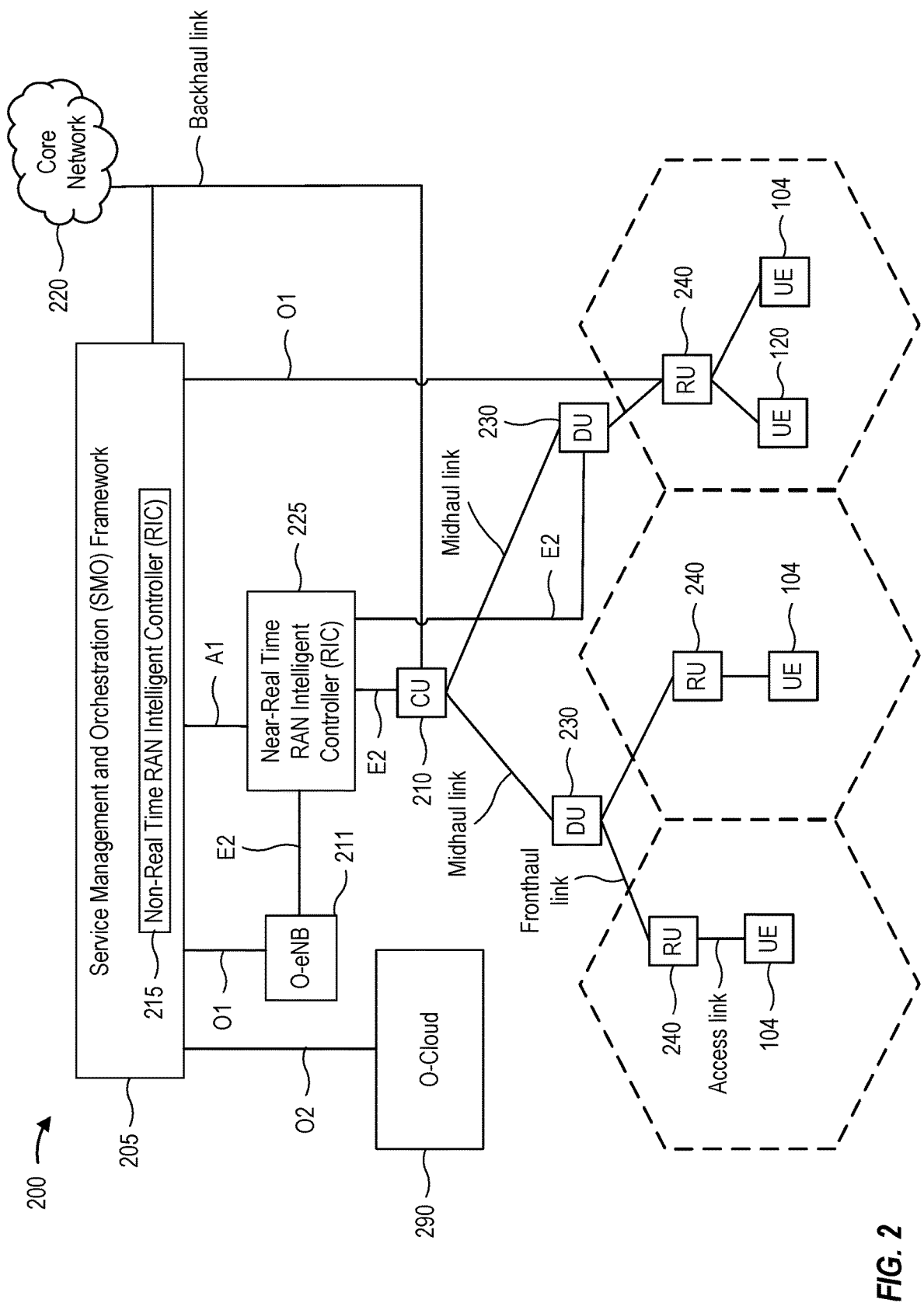
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (MC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 14:
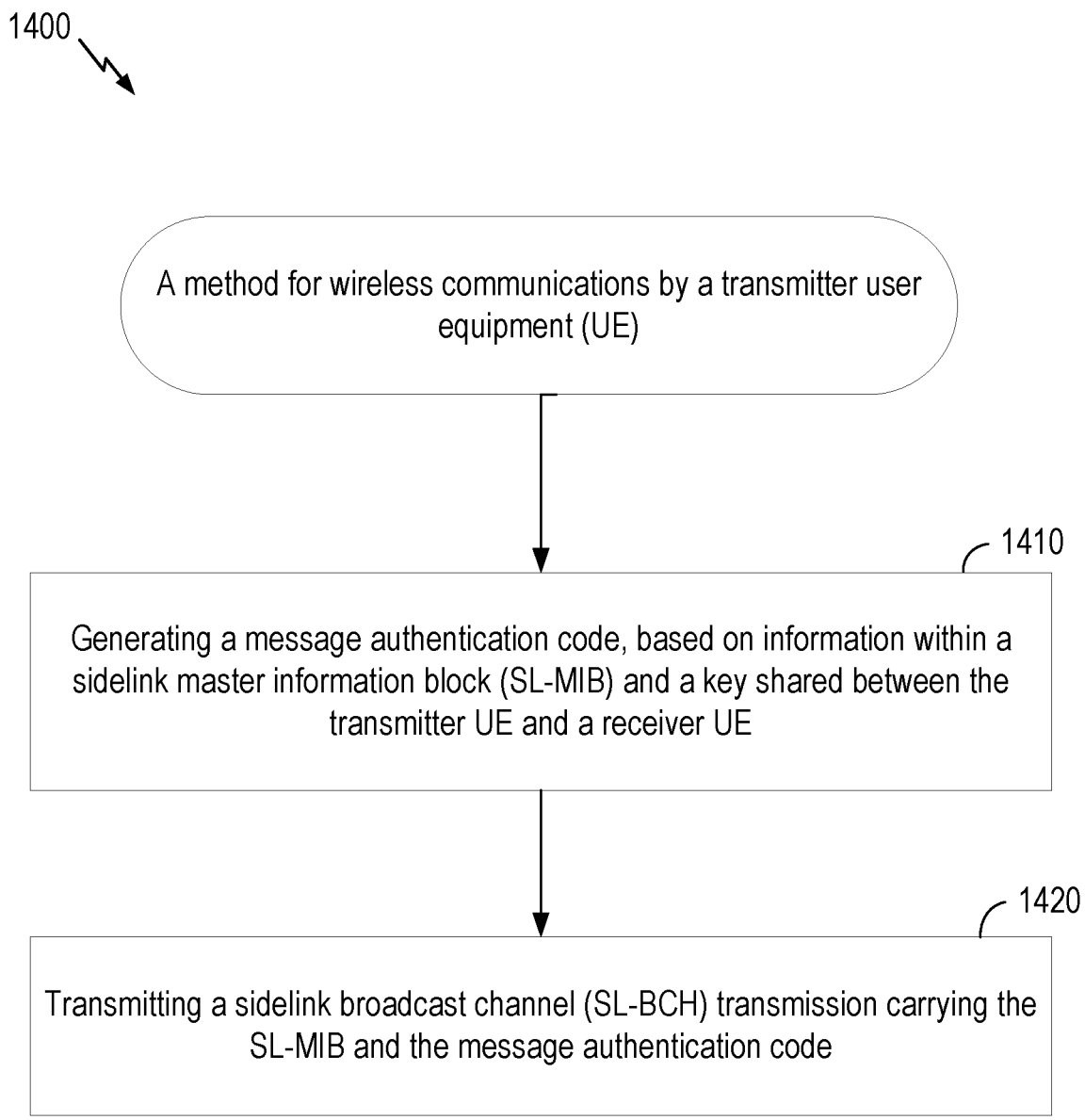
FIG. 14 depicts a method for wireless communications by a transmitter UE.
Figure 15:
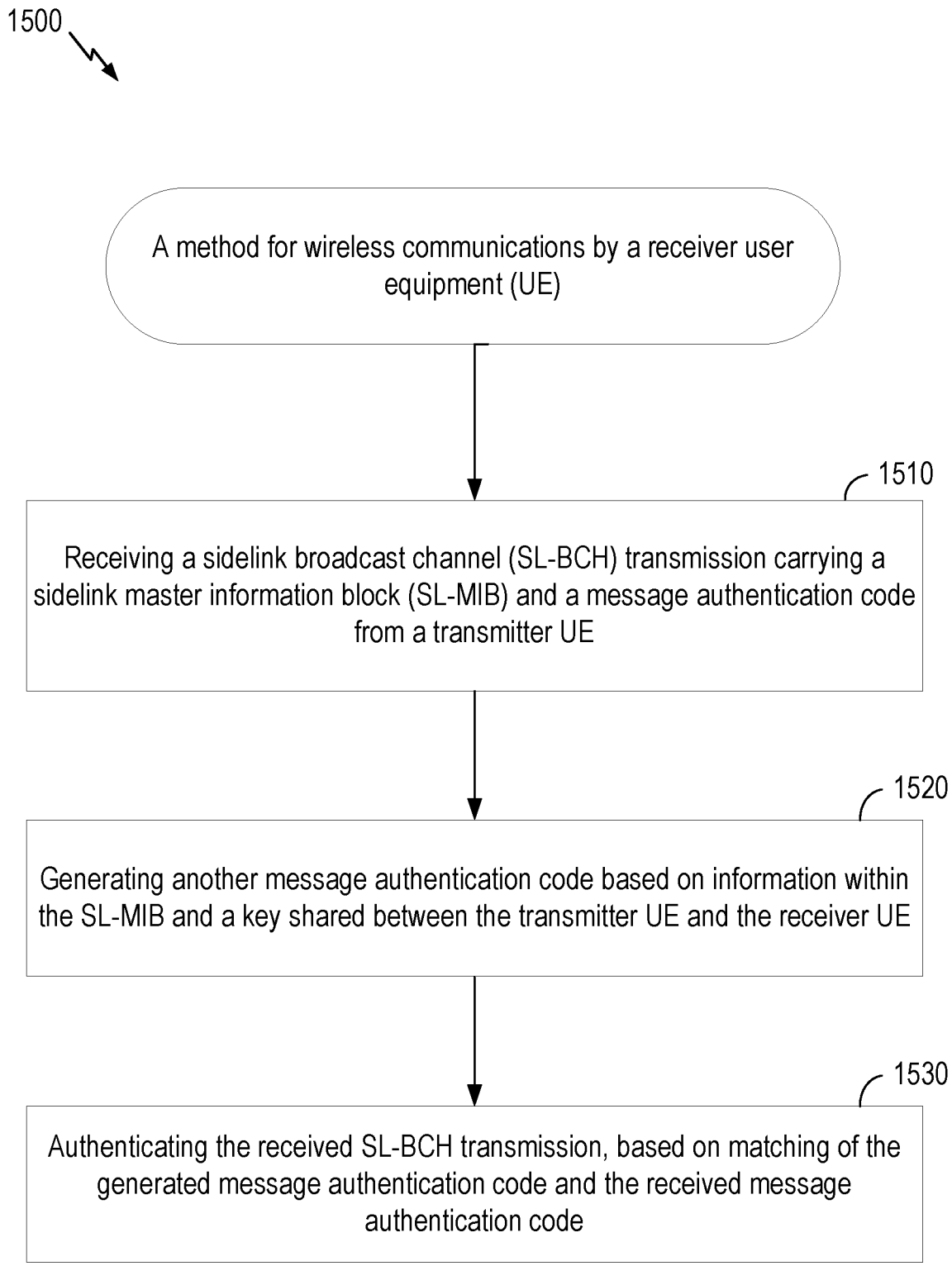
FIG. 15 depicts a method for wireless communications by a receiver UE.

Wireless communication network 100 further includes authentication component 198, which may be configured to perform operations 1400 of FIG. 14 and/or operations 1500 of FIG. 15.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$r$ d Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
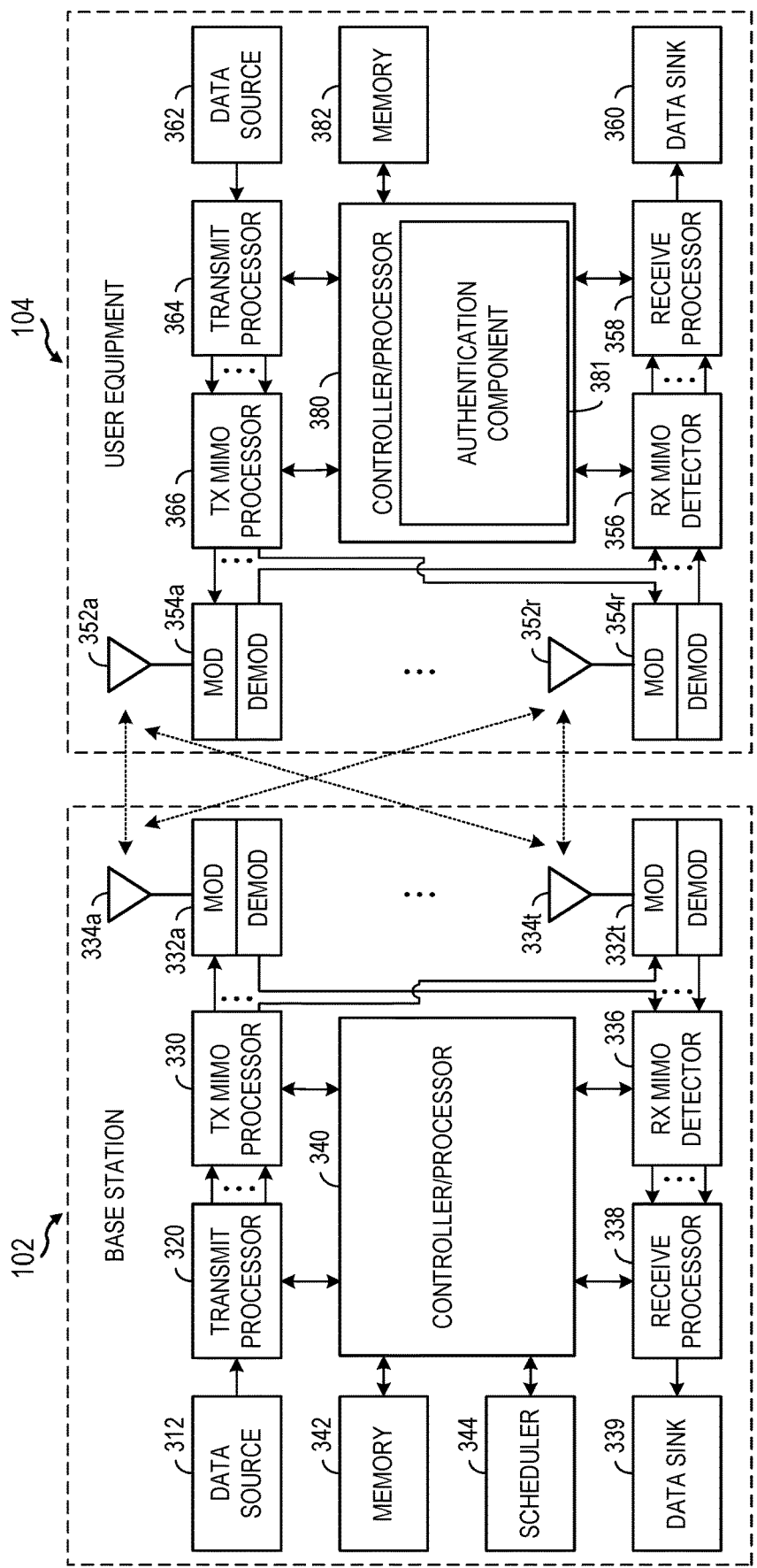
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes authentication component 381, which may be representative of authentication component 198 of FIG. 1. Notably, while depicted as an aspect of controller/processor 380, authentication component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$, is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Sidelink Systems

User equipments (UEs) communicate with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications.

A sidelink signal refers to a signal communicated from one UE to another UE without relaying that communication through a scheduling entity (e.g., UE or a network entity), even though the scheduling entity may be utilized for scheduling and/or control purposes. In some examples, the sidelink signal is communicated using a licensed spectrum (e.g., unlike wireless local area networks, which typically use an unlicensed spectrum). One example of sidelink communication is PC5, for example, as used in V2V, long term evolution (LTE), and/or new radio (NR).

Various sidelink channels are used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH carries discovery expressions that enable proximal UEs to discover each other. The PSCCH carries control signaling such as sidelink resource configurations, resource reservations, and other parameters used for data transmissions. The PSSCH carries data transmissions. The PSFCH carries a feedback such as acknowledgement (ACK) and/or negative ACK (NACK) information corresponding to transmissions on the PSSCH.

In some NR systems, a two stage sidelink control information (SCI) is supported. The two stage SCI includes a first stage SCI (e.g., SCI-1) and a second stage SCI (e.g., SCI-2). The SCI-1 includes resource reservation and allocation information. The SCI-2 includes information that can be used to decode data and to determine whether a UE is an intended recipient of a transmission. The SCI-1 and/or the SCI-2 may be transmitted over a PSCCH.

Figure 5B:
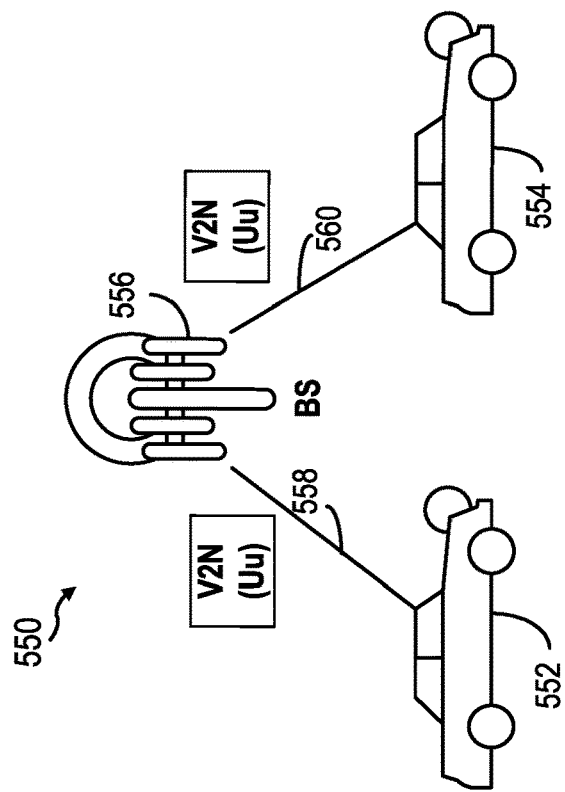
FIGS. 5A-5B depict diagrammatic representations of example vehicle-to-everything (V2X) systems.
Figure 5A:
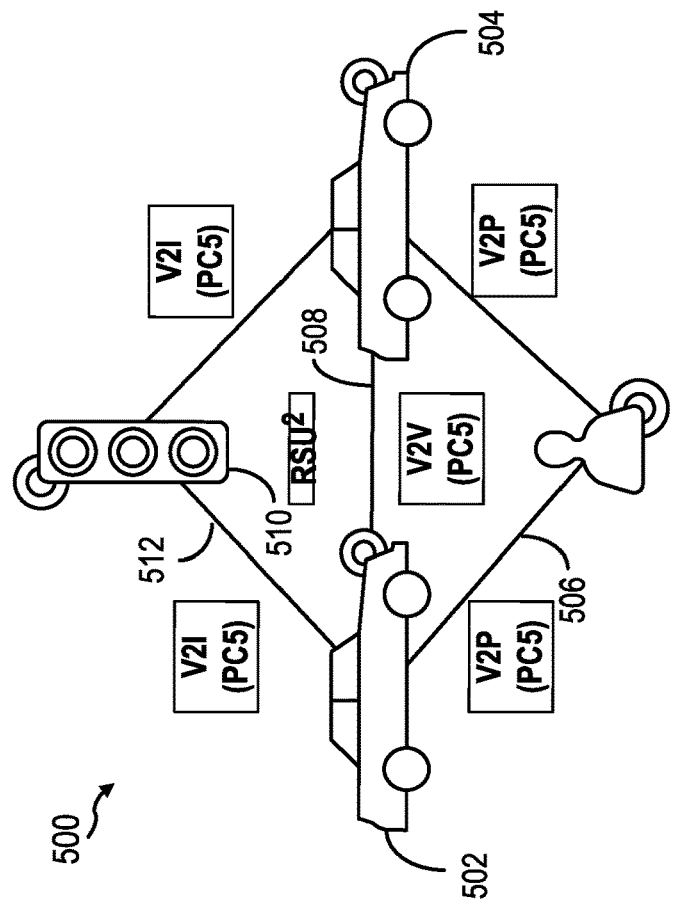

FIG. 5A and FIG. 5B show diagrammatic representations of example V2X systems. For example, vehicles shown in FIG. 5A and FIG. 5B communicate via sidelink channels and relay sidelink transmissions. V2X is a vehicular technology system that enables vehicles to communicate with traffic and an environment around them using short-range wireless signals, known as sidelink signals.

The V2X systems shown in FIG. 5A and FIG. 5B provide two complementary transmission modes. A first transmission mode, shown by way of example in FIG. 5A, involves direct communications (e.g., also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (e.g., including V2V communications) is illustrated with two vehicles 502, 504. A first transmission mode allows for direct communication between different participants in a given geographic location. As illustrated, a vehicle 502 can have a wireless communication link 506 with an individual through a PC5 interface. Communications between the vehicles 502 and 504 may also occur through a PC5 interface 508. In a like manner, communication may occur from the vehicle 502 to other highway components (e.g., a roadside unit (RSU) 510), such as a traffic signal or sign through a PC5 interface 512. With respect to each communication link illustrated in FIG. 5A, two-way communication may take place between devices, therefore each device may be a transmitter and a receiver of information. The V2X system 500 is a self-managed system implemented without assistance from a network entity. A self-managed system may enable improved spectral efficiency, reduced cost, and increased reliability as network service interruptions do not occur during handover operations for moving vehicles. The V2X system 500 is configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. Network communications may occur through discrete nodes, such as a network entity 556 that sends and receives information to and from (e.g., relays information between) the vehicles 552, 554. The network communications through vehicle to network (V2N) links 558 and 560 may be used, for example, for long-range communications between the vehicles 552, 554, such as for communicating the presence of a car accident a distance ahead along a road or highway. Other types of communications may be sent by a wireless node to the vehicles 552, 554, such as traffic flow conditions, road hazard warnings, environmental/weather reports, and service station availability, among other examples. Such data can be obtained from cloud-based sharing services.

Example Synchronization in Sidelink Systems

In current new radio (NR) vehicle-to-everything (V2X) systems, a synchronization procedure for user equipments (UEs) such as vehicles is performed under the assumption that all the UEs are legitimate (i.e., mutual trust between the UEs is assumed).

In the NR VRX system, a UE directly or indirectly synchronizes with a global navigation satellite system (GNSS), gNodeB (gNB), and/or eNodeB (eNB), to acquire frequency and time synchronization. The UE transmits a sidelink synchronization signal block (S-SSB) to other UEs, in accordance with preconfigured transmission rules, to propagate established timing. However, in some cases, when the UE is unable to detect any signals from the GNSS/gNB/eNB or the S-SSB from the other UEs, the UE may transmit the S-SSB on its own to become an independent synchronization source.

Figure 6:
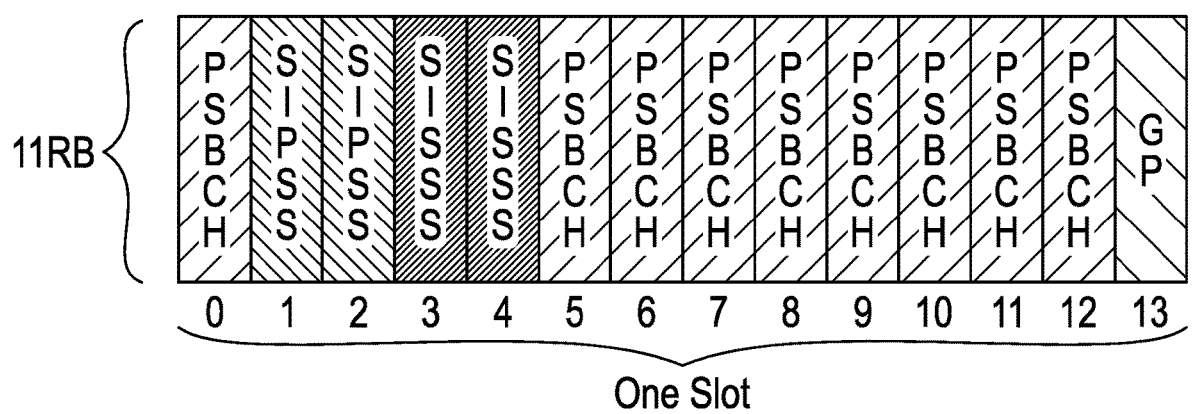
FIG. 6 depicts example new radio (NR) V2X sidelink synchronization block (S-SSB) occupying multiple physical resource blocks (PRBs) over a full-time slot.

In some cases, as illustrated in FIG. 6, the S-SSB occupies eleven physical resource blocks (PRBs) over a full-time slot. The other PRBs in the slot are not used for a data channel transmission. In some cases, the S-SSB may be transmitted in a periodical manner and repeated within a period (e.g., 1, 2, 4 S-SSB transmissions within a 160 ms period).

Figure 7:
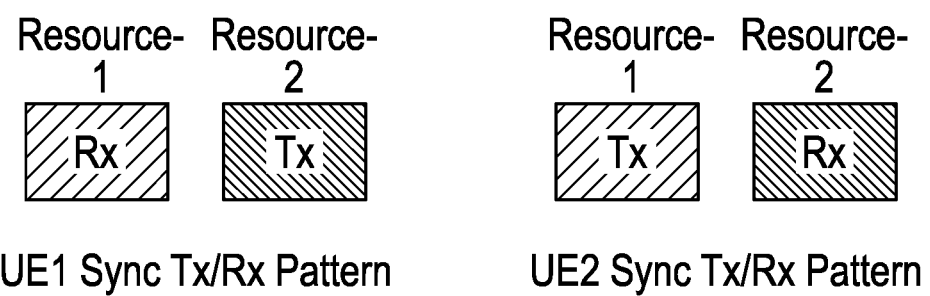
FIG. 7 depicts example resources of different UEs for transmitting and/or receieiving S-SSBs.

In some cases, the NR VRX system may include multiple UEs (e.g., UE1, UE2, and UE3). When a UE (e.g., UE2) is out-of-coverage (OoC) of a network entity and is near another UE (e.g., UE3) with GNSS coverage or a UE (e.g., UE1) that transmits the S-SSB, then as illustrated in FIG. 7, UE2 receives the S-SSB from UE1 and UE3 in one resource and transmits the S-SSB to other UEs in another resource.

Figure 8:
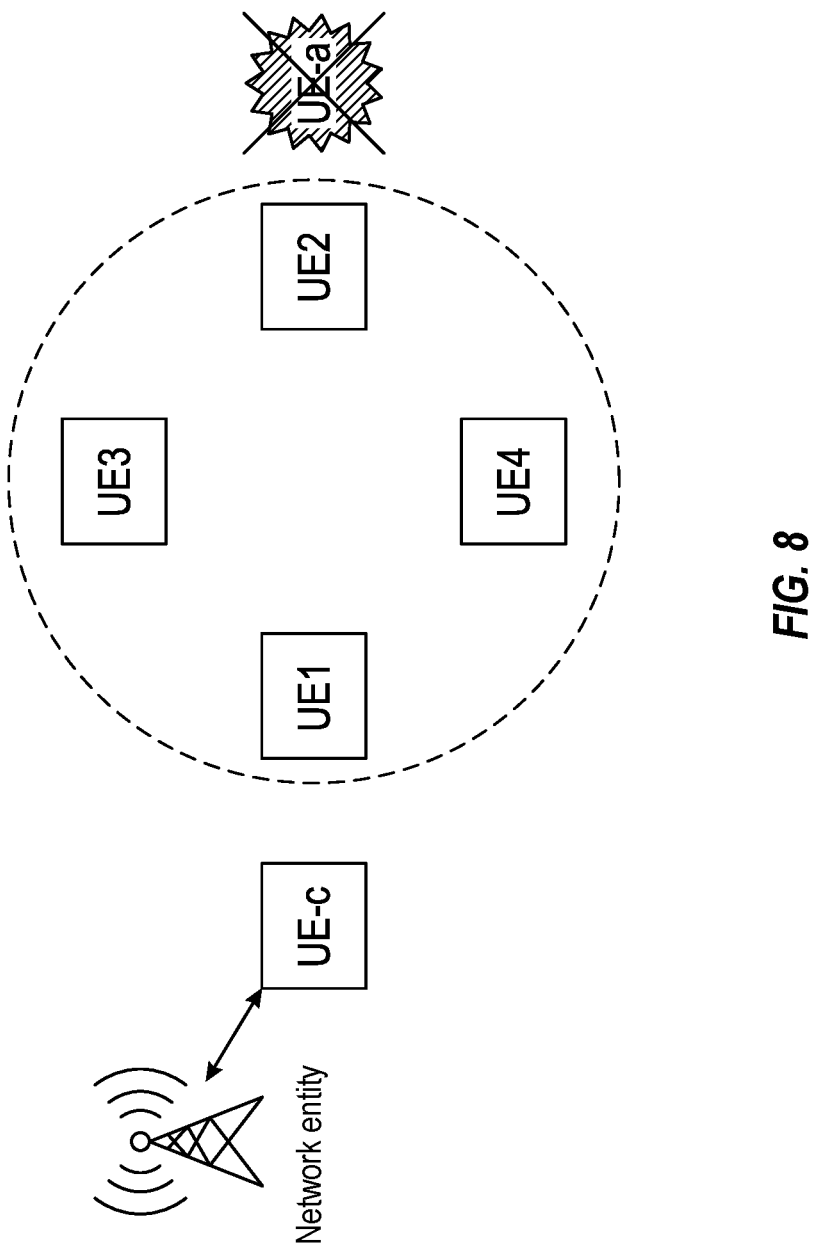
FIG. 8 depicts example sidelink operation where UE2, UE3, and UE4 derive timing from legitimate UE1.

In some cases, as illustrated in FIG. 8, multiple legitimate UEs (such as UE1, UE2, UE3, and UE4) may form a group. UE1 may be a transmitter UE and other UEs of the group may be receiver UEs. UE1 may transmit S-SSB towards the other UEs of the group. The other UEs (e.g., in absence of any attacker UE such as UE-a, which is not part of the group) may derive their timing based on the received S-SSB from UE1.

Figure 9:
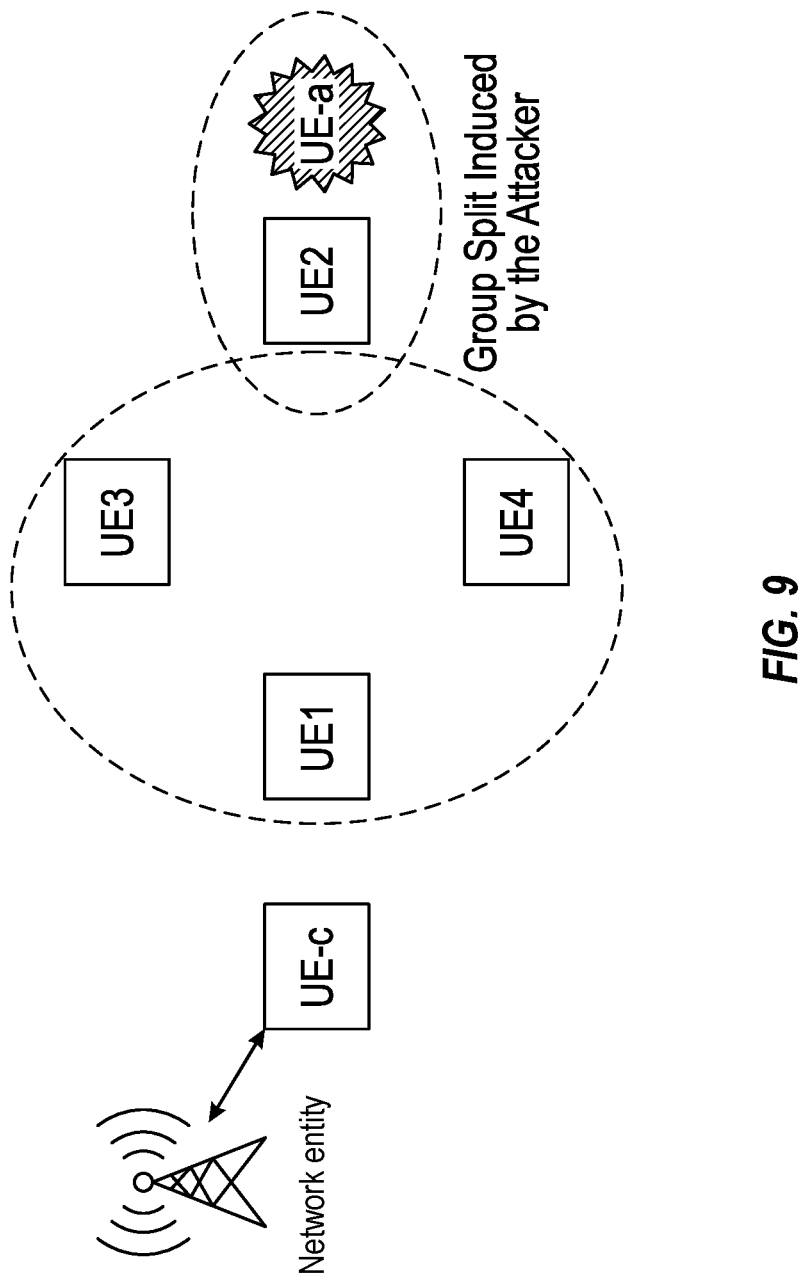
FIG. 9 depicts example sidelink operation where UE2 derives timing from attacker UE-a.

However, when UE-a is present closer to the UEs of this group, UE-a may transmit the S-SSB towards the UEs of the group to split the group. For example, as illustrated in FIG. 9, UE-a transmits the S-SSB towards UE2. Since UE2 and UE-a are closer to each other than UE2 and UE1, UE2 may derive timing from the S-SSB received from UE-a. UE2 may derive the timing from the S-SSB received from UE-a and not from UE1, because reference signal receive power (RSRP) received from UE-a is higher than RSRP received from UE1. So, UE-a is able to mislead UE2 to derive timing from UE-a and not from UE1. In this case, UE2 will be unable to decode other V2X signals from other UEs in the group, based on the derived timing from UE-a, and thereby jeopardizing its operation and safety.

Accordingly, there is a need to determine the authenticity of the derived timing when: (a) a first UE derives timing from a second UE, which is in-coverage (IoC) of a network entity; and (b) the first UE derives timing from a third UE, which is OoC of the network entity.

Aspects Related to Secure Timing for Sidelink Systems

Aspects of the present disclosure provide apparatuses, methods, processing systems, and computer-readable mediums for determining timing authenticity in a sidelink system.

For example, a transmitter user equipment (UE) transmitting a sidelink synchronization signal block (S-SSB), via a sidelink broadcast channel (SL-BCH) transmission, provides a first message authentication code along with the S-SSB, to allow a receiver UE receiving the SL-BCH transmission verify the authenticity of the SL-BCH transmission content. The transmitter UE generates the first message authentication code, based on a shared key (e.g., shared with the receiver UE) and data contained in the SL-BCH transmission. The receiver UE derives timing from the transmitter UE based on the received SL-BCH transmission, and decodes the data contained in the SL-BCH transmission. The receiver UE uses the decoded data along with the shared key to generate a second message authentication code. The receiver UE authenticates the received SL-BCH transmission and the derived timing, when the first message authentication code is same as the second message authentication code. However, when the first message authentication code is different from the second message authentication code, the receiver UE disregards the derived timing and moves on to look for alternate timing derivation from another UE.

Techniques proposed herein provide enhanced security in the sidelink system by preventing attacker UEs from jeopardizing operation and safety of legitimate UEs operating in the sidelink system. The techniques proposed herein may be understood with reference to FIGS. 10-15.

Figure 10:
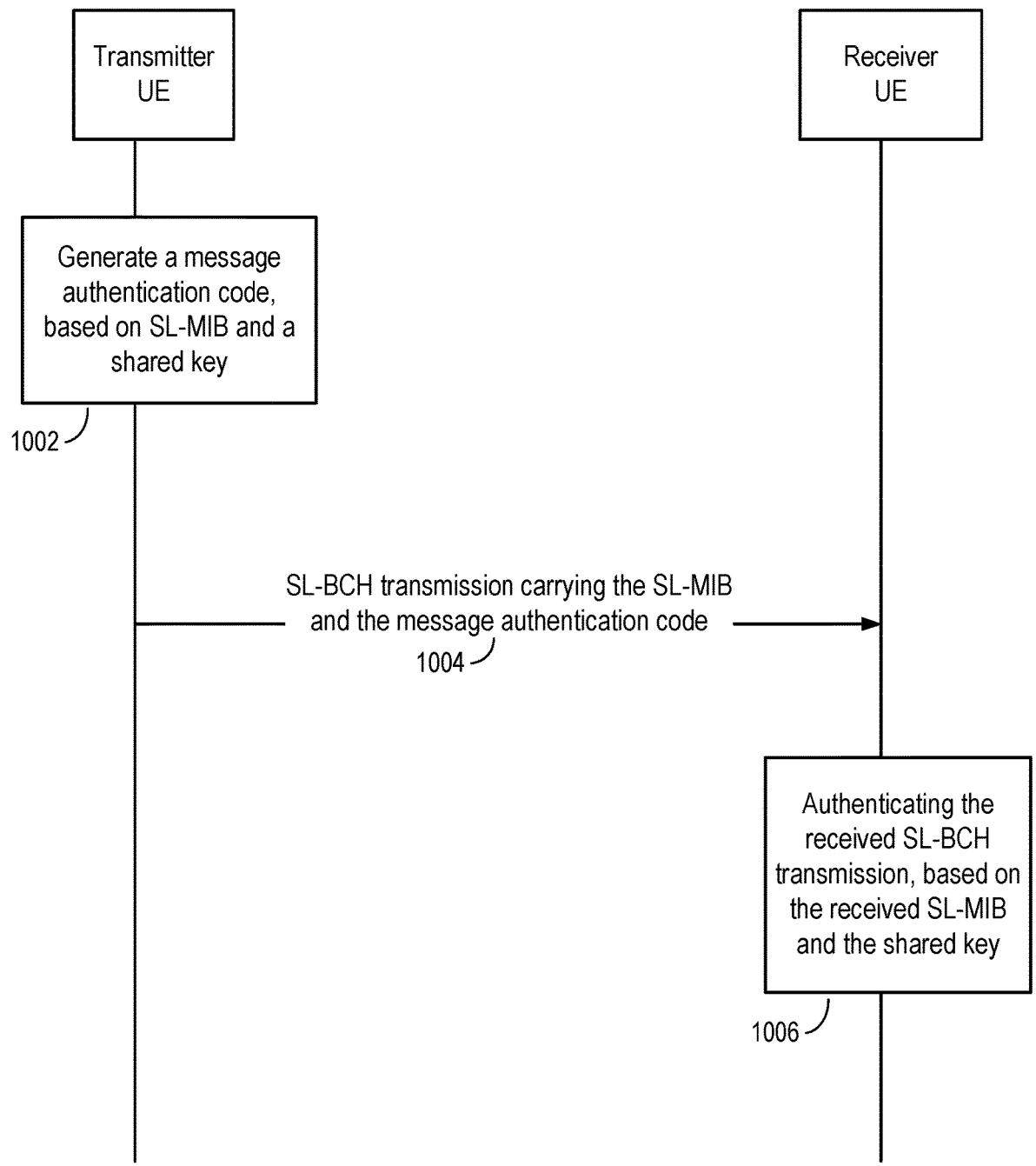
FIG. 10 depicts a call flow diagram illustrating example communication between a transmitter UE and a receiver UE.

As illustrated in FIG. 10, at 1002, a transmitter UE (e.g., such as UE 104 in wireless communication network 100 of FIG. 1) generates a message authentication code. The transmitter UE generates the message authentication code, based on information within a sidelink master information block (SL-MIB) and a key. The key is a shared key, which is shared between the transmitter UE and a receiver UE.

In certain aspects, the information within the SL-MIB indicates common information and/or specific information. The common information corresponds to a carrier bandwidth. The specific information corresponds to a time division duplex (TDD) configuration of the transmitter UE, a frame number, a subframe number, a slot number, and/or an in-coverage (InC) indicator of the transmitter UE.

In certain aspects, the transmitter UE generates the message authentication code, based on a subset of the information within the SL-MIB and the key. For example, the transmitter UE may generate the message authentication code, based on the common information and the key. In another example, the transmitter UE may generate the message authentication code, based on the specific information and the key. In another example, the transmitter UE may generate the message authentication code, based on a subset of the specific information and the key.

Figure 11:
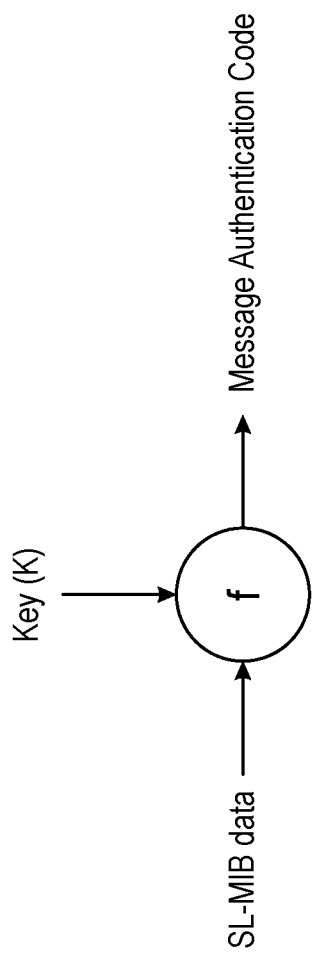
FIG. 11 depicts example generation of a message authentication code.

In certain aspects, the transmitter UE generates the message authentication code using a predefined function (f). The predefined function may be a one-way mapping function. The predefined function may be a hash function. The predefined function may be used to minimize a number of bits (e.g., of the message authentication code), which can be carried in a SL-BCH transmission. For example, as illustrated in FIG. 11, the transmitter UE uses the predefined function, and the information within the SL-MIB and the key as inputs, to generate the message authentication code that can be carried in the SL-BCH transmission.

In certain aspects, the transmitter UE derives the key, based on a type of a sidelink indicator (SLI) used by the transmitter UE. For example, the transmitter UE may derive the key, based on InC SLI used by the transmitter UE. In another example, the transmitter UE may derive the key, based on out of coverage SLI (OoC SLI) used by the transmitter UE.

In certain aspects, the transmitter UE derives the key, based on a field coverage status of the transmitter UE. The field coverage status of the transmitter UE indicates whether the transmitter UE is within or outside a coverage of a network entity.

Figure 12:
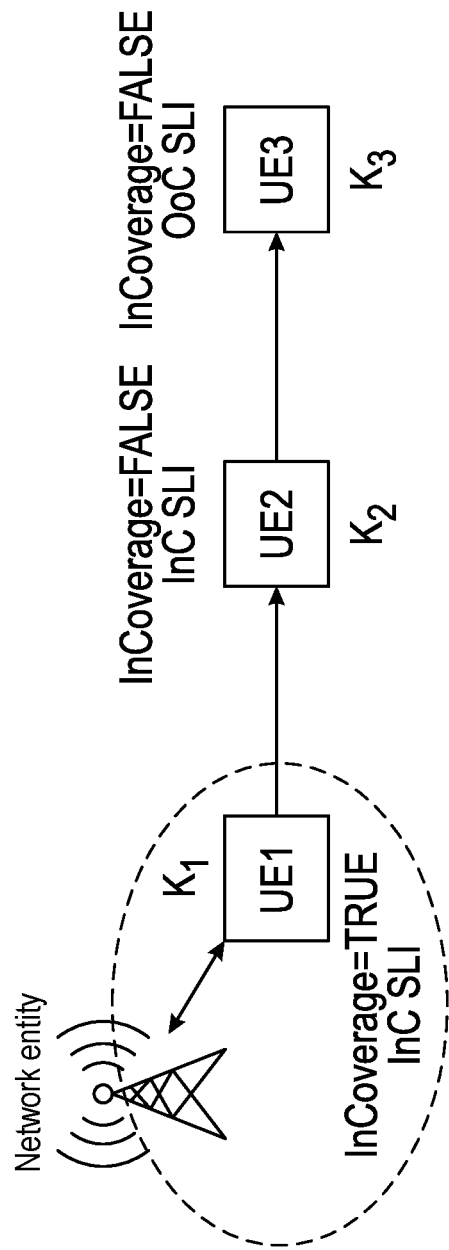
FIG. 12 depicts example key configuration for secure generation of a sidelink broadcast channel (SL-BCH) transmission.

For example, as illustrated in FIG. 12, when the transmitter UE such as UE1 is within the coverage of the network entity (e.g., InC is true) and uses InC SLI as its SLI, UE1 uses key ($K_1$) and information within its SL-MIB to generate the message authentication code.

In another example, as illustrated in FIG. 12, when the transmitter UE such as UE2 is OoC of the network entity (e.g., InC is false) and derives its timing from InC UE1, UE2 sets its SLI to be InC SLI. In such cases, UE2 uses key ($K_2$) and information within its SL-MIB to generate the message authentication code.

In another example, as illustrated in FIG. 12, when the transmitter UE such as UE3 is OoC of the network entity (e.g., InC is false) and derives its timing from OoC UE2, UE2 sets its SLI to be OoC SLI. In such cases, UE2 uses key ($K_3$) and information within its SL-MIB to generate the message authentication code.

In certain aspects, the transmitter UE derives the key, based on the type of SLI and the field coverage status of the transmitter UE.

In certain aspects, the transmitter UE preconfigures the key and uses the preconfigured key for generating the message authentication code. For example, a static key may be preconfigured in the transmitter UE for generating the message authentication code.

In certain aspects, the transmitter UE derives the key, based on a preconfigured static base key (K_b), using a preconfigured key derivation function (KDF). In certain aspects, the transmitter UE derives the key, based on a geographical zone identification (ID) of the transmitter UE, using the preconfigured KDF. In certain aspects, the transmitter UE derives the key, based on the preconfigured static base key and the geographical zone ID of the transmitter UE, using the preconfigured KDF. For example, the key is equal to KDF($K_b$, zone ID).

In certain aspects, the information within the SL-MIB also indicates the geographical zone ID of the transmitter UE. For example, the transmitter UE may send the geographical zone ID via the SL-BCH transmission to the receiver UE, to enable verification of the message authentication code.

Figure 13:
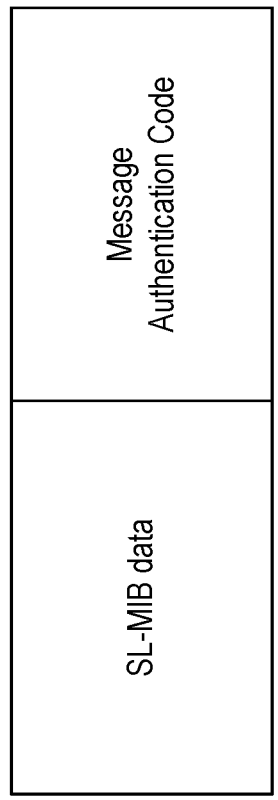
FIG. 13 depicts example SL-BCH transmission carrying a sidelink master information block (SL-MIB) and a message authentication code.

Referring back to FIG. 10, at 1004, the transmitter UE generates and transmits the SL-BCH transmission to the receiver UE. For example, as illustrated in FIG. 13, the SL-BCH transmission carries the SL-MIB and the message authentication code.

Referring back to FIG. 10, at 1006, the receiver UE authenticates the received SL-BCH transmission from the transmitter UE. For example, the receiver UE may generate another message authentication code, based on the information within the received SL-MIB and the key (e.g., the shared key which is with the receiver UE). The receiver UE authenticates the received SL-BCH transmission and/or the received message authentication code, based on matching of the generated message authentication code (e.g., at the receiver UE) and the received message authentication code (e.g., from the transmitter UE).

In one example, when the generated message authentication code matches the received message authentication code, the receiver UE authenticates the received SL-BCH transmission and/or the received message authentication code. The receiver UE can then derive timing from the transmitter UE and use the derived timing. In another example, when the generated message authentication code does not match the received message authentication code, the receiver UE does not authenticate the received SL-BCH transmission and/or the received message authentication code.

In certain aspects, the receiver UE obtains or derives timing information from the transmitter UE, based on a reference signal receive power (RSRP) and/or a preconfigured rule. For example, the receiver UE may obtain synchronization timing from the transmitter UE (e.g., based on the RSRP and the preconfigured rule). In one example, the receiver UE may use the obtained timing information, when the generated message authentication code matches the received message authentication code. In another example, the receiver UE may discard the obtained timing information, when the generated message authentication code does not match the received message authentication code. The receiver UE may then move on to determine alternate timing derivation from another UE.

In certain aspects, the receiver UE decodes the SL-MIB, to determine the information within the SL-MIB. The information within the SL-MIB indicates the type of the SLI including an InC SLI or OoC SLI used by the transmitter UE. For example, the receiver UE may decode the SL-MIB content to infer the SLI and InC indicator fields. The information within the SL-MIB also indicates the field coverage status of the transmitter UE indicating whether the transmitter UE is within or outside the coverage of the network entity.

In certain aspects, the receiver UE derives the key, based on the above-noted decoded information within the received SL-MIB. The receiver UE generates the another message authentication code, based on the decoded information within the received SL-MIB and the derived key. For example, the receiver UE may use an appropriate key ($K_1$, $K_2$, or $K_3$) based on whether the SLI belongs to InC or OoC group per the decoded information within the received SL-MIB, and whether the InC field is true or false together with the decoded SL-MIB content to obtain the inferred message authentication code or signature ($\hat{S}$).

As noted above, the SLI and the InC status combination maps to a unique key. In one example, when the transmitter UE advertises the SLI that represents InC identity and the InC status to be false, in such a case, the transmitter UE should have used key $K_2$ to generate the message authentication code. In another example, when the transmitter UE advertises the SLI that represents OoC identity, and the InC status to be false, in such a case, the transmitter UE should have used key $K_3$ to generate the message authentication code. Accordingly, any legitimate receiver UE that is aware of a mapping rule uses the appropriate key, based on the decoded information within the received SL-MIB, to check for authenticity of the received SL-BCH transmission and/or the received message authentication code. It is expected that eavesdropper UE is not aware of the mapping rule, and hence any legitimate receiver UE can identify the attack. In some cases, the mapping rule may be dynamically changed to legitimate UEs when these UEs are in a network coverage.

In certain aspects, the receiver UE preconfigures the key. The receiver UE generates the another message authentication code, based on the information within the received SL-MIB and the preconfigured key.

In certain aspects, the receiver UE derives the key, based on a preconfigured static base key and/or the geographical zone ID of the transmitter UE, using a preconfigured KDF. The receiver UE generates the another message authentication code, based on the information within the SL-MIB and the derived key. For example, the receiver UE may use the preconfigured static base key or the geographical zone ID dependent key, together with the decoded SL-MIB content, to obtain the inferred message authentication code or signature ($\hat{S}$).

In certain aspects, the receiver UE determines a field coverage status of previous UEs within the geographical zone ID of the transmitter UE. The receiver UE authenticates the received SL-BCH transmission, based on the determined field coverage status. For example, when the geographical zone ID is advertised by the transmitter UE, the receiver UE may use the knowledge of the InC status of the advertised geographical zone ID, to verify the authenticity of the received SL-BCH transmission and/or the received message authentication code.

In certain aspects, the receiver UE may be aware of the InC status of one or more zones in its vicinity, based on a history of InC status associated with these zones or through many other UEs in these zones that may have indicated their InC status. For example, the receiver UE may have a database of coverage status collected from many other UEs in its vicinity. This option becomes useful, if the eavesdropper UE is somehow aware of the key mapping rule, in which case, the receiver UE may perform another level of authentication by using this option.

In certain aspects, the key corresponds to a public key pair including a public key and a private key. In such cases, the transmitter UE may transmit an indication of the public key to the receiver UE. For example, in case of public/private key usage, the transmitter UE provides ID of the public key to the receiver UE, which is used by the receiver UE for verifying the received message authentication code.

In certain aspects, the transmitter UE generates the message authentication code, based on the information within the SL-MIB and the private key. For example, the transmitter UE may use the private key and the SL-BCH transmission content to generate the message authentication code, and then send the message authentication code along with the SL-BCH transmission. The receiver UE may verify the received message authentication code, based on the public key indicated by the key ID along with the received SL-BCH transmission content.

In certain aspects, the transmitter UE may transmit a certificate ID to the receiver UE. For example, the transmitter UE may use the private key to generate message authentication code, and the receiver UE may use the key corresponding to the certificate ID and the received SL-BCH transmission content to verify the received message authentication code.

FIG. 14 illustrates example operations 1400 for wireless communication. The operations 1400 may be performed, for example, by a transmitter UE (e.g., such as UE 104 in wireless communication network 100 of FIG. 1). The operations 1400 may be implemented as software components that are executed and run on one or more processors (e.g., controller/processor 380 of FIG. 3). Further, transmission and reception of signals by the transmitter UE in the operations 1400 may be enabled, for example, by one or more antennas (e.g., antennas 352 of FIG. 3). In certain aspects, the transmission and/or reception of signals by the transmitter UE may be implemented via a bus interface of one or more processors (e.g., the controller/processor 380) obtaining and/or outputting signals.

The operations 1400 begin, at 1410, by generating a message authentication code, based on information within a SL-MIB and a key shared between the transmitter UE and a receiver UE. For example, the transmitter UE may generate the message authentication code, using a processor, antenna(s) and/or transceiver components of UE 104 shown in FIG. 1 or FIG. 3 and/or of the apparatus shown in FIG. 16.

At 1420, the transmitter UE transmits a SL-BCH transmission carrying the SL-MIB and the message authentication code. For example, the transmitter UE may transmit the SL-BCH transmission, using antenna(s) and/or transmitter/transceiver components of UE 104 shown in FIG. 1 or FIG. 3 and/or of the apparatus shown in FIG. 16.

Note that FIG. 14 is just one example of a method, and other methods including fewer, additional, or alternative steps are possible consistent with this disclosure.

FIG. 15 illustrates example operations 1500 for wireless communication. The operations 1500 may be performed, for example, by a receiver UE (e.g., such as UE 104 in wireless communication network 100 of FIG. 1). The operations 1500 may be implemented as software components that are executed and run on one or more processors (e.g., controller/processor 380 of FIG. 3). Further, transmission and reception of signals by the receiver UE in the operations 1500 may be enabled, for example, by one or more antennas (e.g., antennas 352 of FIG. 3). In certain aspects, the transmission and/or reception of signals by the receiver UE may be implemented via a bus interface of one or more processors (e.g., the controller/processor 380) obtaining and/or outputting signals.

The operations 1500 begin, at 1510, by receiving a SL-BCH transmission carrying a SL-MIB and a message authentication code from a transmitter UE. For example, the receiver UE may receive the SL-BCH transmission, using antenna(s) and/or receiver/transceiver components of UE 104 shown in FIG. 1 or FIG. 3 and/or of the apparatus shown in FIG. 17.

At 1520, the receiver UE generates another message authentication code, based on information within the SL-MIB and a key shared between the transmitter UE and the receiver UE. For example, the receiver UE may generate the another message authentication code, using a processor, antenna(s) and/or transceiver components of UE 104 shown in FIG. 1 or FIG. 3 and/or of the apparatus shown in FIG. 17.

At 1530, the receiver UE authenticates the received SL-BCH transmission, based on matching of the generated message authentication code and the received message authentication code. For example, the receiver UE may authenticate the received SL-BCH transmission, using a processor, antenna(s) and/or transceiver components of UE 104 shown in FIG. 1 or FIG. 3 and/or of the apparatus shown in FIG. 17.

Note that FIG. 15 is just one example of a method, and other methods including fewer, additional, or alternative steps are possible consistent with this disclosure.

Example Communications Devices

Figure 16:
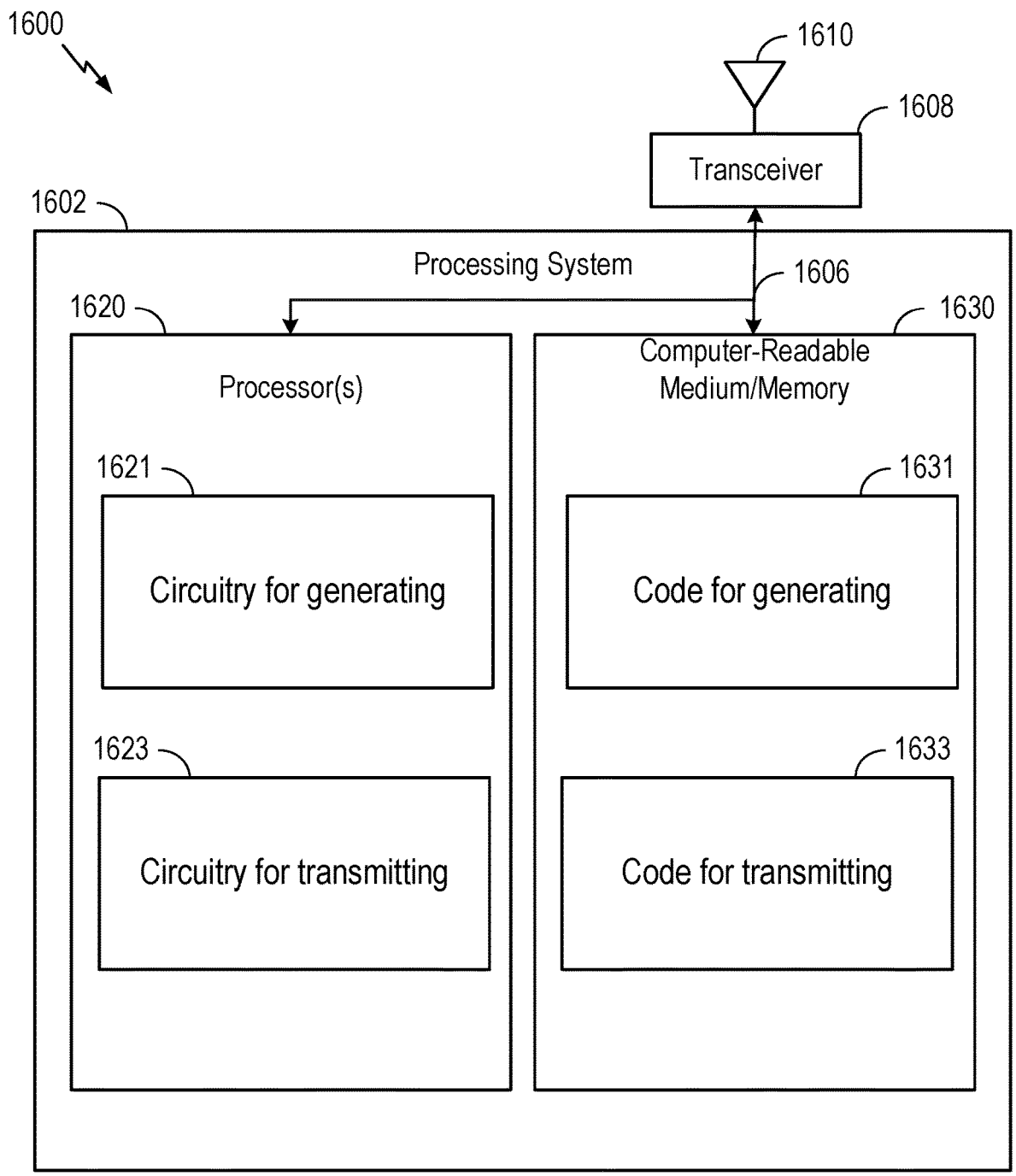
FIGS. 16-17 depict aspects of example communications devices.

FIG. 16 depicts aspects of an example communications device 1600. In some aspects, communications device 1600 is a transmitter UE, such as UE 104 described above with respect to FIGS. 1 and 3.

The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes one or more processors 1620. In various aspects, the one or more processors 1620 may be representative of one or more of receive processor 358, transmit processor 364, TX MIMO processor 366, and/or controller/processor 380, as described with respect to FIG. 3. The one or more processors 1620 are coupled to a computer-readable medium/memory 1630 via a bus 1606. In certain aspects, the computer-readable medium/memory 1630 is configured to store instructions (e.g., computer-executable code) that when executed by the one or more processors 1620, cause the one or more processors 1620 to perform the operations 1400 described with respect to FIG. 14, or any aspect related to it. Note that reference to a processor performing a function of communications device 1600 may include one or more processors performing that function of communications device 1600.

In the depicted example, computer-readable medium/memory 1630 stores code (e.g., executable instructions) for generating 1631 comprising code for generating a message authentication code, based on information within a SL-MIB and a key shared between the transmitter UE and a receiver UE, and code for transmitting 1633 comprising code for transmitting a SL-BCH transmission carrying the SL-MIB and the message authentication code. Processing of the code 1631-1633 may cause the communications device 1600 to perform the operations 1400 described with respect to FIG. 14, or any aspect related to it.

The one or more processors 1620 include circuitry configured to implement (e.g., execute) the code stored in the computer-readable medium/memory 1630, including circuitry for generating 1621 comprising circuitry for generating a message authentication code, based on information within a SL-MIB and a key shared between the transmitter UE and a receiver UE, and circuitry for transmitting 1623 comprising circuitry for transmitting a SL-BCH transmission carrying the SL-MIB and the message authentication code. Processing with circuitry 1621-1623 may cause the communications device 1600 to perform the operations 1400 described with respect to FIG. 14, or any aspect related to it.

Various components of the communications device 1600 may provide means for performing the operations 1400 described with respect to FIG. 14, or any aspect related to it. For example, means for transmitting, sending or outputting for transmission may include the transceivers 354 and/or antenna(s) 352 of the UE 104 illustrated in FIG. 3 and/or transceiver 1608 and antenna 1610 of the communications device 1600 in FIG. 16. Means for receiving or obtaining may include the transceivers 354 and/or antenna(s) 352 of the UE 104 illustrated in FIG. 3 and/or transceiver 1608 and antenna 1610 of the communications device 1600 in FIG. 16.

Figure 17:
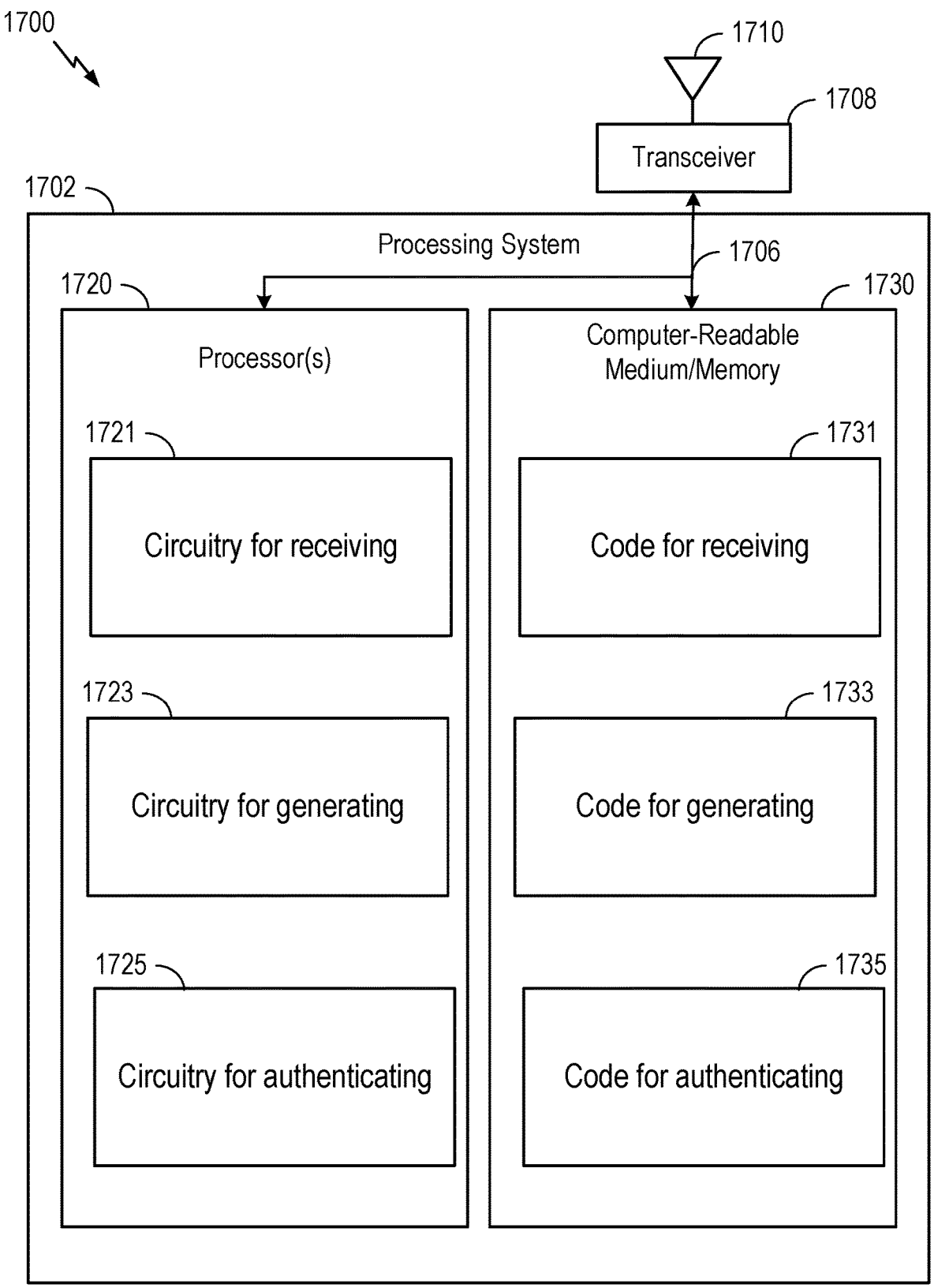

FIG. 17 depicts aspects of an example communications device 1700. In some aspects, communications device 1700 is a receiver UE, such as UE 104 described above with respect to FIGS. 1 and 3.

The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes one or more processors 1720. In various aspects, the one or more processors 1720 may be representative of one or more of receive processor 358, transmit processor 364, TX MIMO processor 366, and/or controller/processor 380, as described with respect to FIG. 3. The one or more processors 1720 are coupled to a computer-readable medium/memory 1730 via a bus 1706. In certain aspects, the computer-readable medium/memory 1730 is configured to store instructions (e.g., computer-executable code) that when executed by the one or more processors 1720, cause the one or more processors 1720 to perform the operations 1500 described with respect to FIG. 15, or any aspect related to it. Note that reference to a processor performing a function of communications device 1700 may include one or more processors performing that function of communications device 1700.

In the depicted example, computer-readable medium/memory 1730 stores code (e.g., executable instructions) for receiving 1731 comprising code for receiving a SL-BCH transmission carrying a SL-MIB and a message authentication code from a transmitter UE, code for generating 1733 comprising code for generating another message authentication code based on information within the SL-MIB and a key shared between the transmitter UE and the receiver UE, and code for authenticating 1735 comprising code for authenticating the received SL-BCH transmission, based on matching of the generated message authentication code and the received message authentication code. Processing of the code 1731-1735 may cause the communications device 1700 to perform the operations 1500 described with respect to FIG. 15, or any aspect related to it.

The one or more processors 1720 include circuitry configured to implement (e.g., execute) the code stored in the computer-readable medium/memory 1730, including circuitry for receiving 1721 comprising circuitry for receiving a SL-BCH transmission carrying a SL-MIB and a message authentication code from a transmitter UE, circuitry for generating 1723 comprising circuitry for generating another message authentication code based on information within the SL-MIB and a key shared between the transmitter UE and the receiver UE, and circuitry for authenticating 1725 comprising circuitry for authenticating the received SL-BCH transmission, based on matching of the generated message authentication code and the received message authentication code. Processing with circuitry 1721-1725 may cause the communications device 1700 to perform the operations 1500 described with respect to FIG. 15, or any aspect related to it.

Various components of the communications device 1700 may provide means for performing the operations 1500 described with respect to FIG. 15, or any aspect related to it. For example, means for transmitting, sending or outputting for transmission may include the transceivers 354 and/or antenna(s) 352 of the UE 104 illustrated in FIG. 3 and/or transceiver 1708 and antenna 1710 of the communications device 1700 in FIG. 17. Means for receiving or obtaining may include the transceivers 354 and/or antenna(s) 352 of the UE 104 illustrated in FIG. 3 and/or transceiver 1708 and antenna 1710 of the communications device 1700 in FIG. 17.

Example Clauses

Implementation examples are described in the following numbered clauses:

Clause 1: A method for wireless communications by a transmitter user equipment (UE), comprising: generating a message authentication code, based on information within a sidelink master information block (SL-MIB) and a key shared between the transmitter UE and a receiver UE; and transmitting a sidelink broadcast channel (SL-BCH) transmission carrying the SL-MIB and the message authentication code.

Clause 2: The method alone or in combination with the first clause, wherein: the information within the SL-MIB indicates at least one of: common information or specific information; the common information indicates a carrier bandwidth; and the specific information indicates at least one of: a time division duplex (TDD) configuration of the transmitter UE, a frame number, a subframe number, a slot number, or an in-coverage indicator of the transmitter UE.

Clause 3: The method alone or in combination with the second clause, wherein the generating comprises generating the message authentication code based on a subset of the information within the SL-MIB and the key.

Clause 4: The method alone or in combination with the first clause, wherein: the generating comprises generating the message authentication code, based on the information within the SL-MIB and the key, using a predefined function; and the predefined function is a one-way mapping function or a hash function.

Clause 5: The method alone or in combination with the first clause, further comprising deriving the key based on at least one of: a type of sidelink indicator (SLI) comprising an in-coverage SLI (InC SLI) or an out of coverage SLI (OoC SLI) used by the transmitter UE; or a field coverage status of the transmitter UE indicating whether the transmitter UE is within or outside a coverage of a network entity.

Clause 6: The method alone or in combination with the first clause, further comprising: preconfiguring the key for generating the message authentication code; and using the preconfigured key for generating the message authentication code.

Clause 7: The method alone or in combination with the first clause, further comprising deriving the key based on at least one of: a preconfigured static base key or a geographical zone identification (ID) of the transmitter UE, using a preconfigured key derivation function.

Clause 8: The method alone or in combination with the seventh clause, wherein the information within the SL-MIB indicates the geographical zone ID of the transmitter UE.

Clause 9: The method alone or in combination with the first clause, wherein: the key corresponds to a public key pair comprising a public key and a private key; and the transmitting further comprises transmitting an indication of the public key to the receiver UE.

Clause 10: The method alone or in combination with the ninth clause, wherein the generating comprises generating the message authentication code, based on the information within the SL-MIB and the private key.

Clause 11: The method alone or in combination with the first clause, wherein the transmitting further comprises transmitting a certificate identification (ID) to the receiver UE.

Clause 12: A method for wireless communications by a receiver user equipment (UE), comprising: receiving a sidelink broadcast channel (SL-BCH) transmission carrying a sidelink master information block (SL-MIB) and a message authentication code from a transmitter UE; generating another message authentication code based on information within the SL-MIB and a key shared between the transmitter UE and the receiver UE; and authenticating the received SL-BCH transmission, based on matching of the generated message authentication code and the received message authentication code.

Clause 13: The method alone or in combination with the twelfth clause, wherein the authenticating comprises authenticating the received SL-BCH transmission, when the generated message authentication code matches the received message authentication code.

Clause 14: The method alone or in combination with the twelfth clause, further comprising obtaining timing information from the transmitter UE, based on at least one of: a reference signal receive power (RSRP) or a preconfigured rule.

Clause 15: The method alone or in combination with the twelfth clause, further comprising using the obtained timing information, when the generated message authentication code matches the received message authentication code.

Clause 16: The method alone or in combination with the twelfth clause, further comprising discarding the obtained timing information, when the generated message authentication code does not match the received message authentication code.

Clause 17: The method alone or in combination with the twelfth clause, further comprising decoding the SL-MIB to determine the information within the SL-MIB, wherein information within the SL-MIB indicates at least one of: a type of sidelink indicator (SLI) comprising an in-coverage SLI (InC SLI) or an out of coverage SLI (OoC SLI) used by the transmitter UE; or a field coverage status of the transmitter UE indicating whether the transmitter UE is within or outside a coverage of a network entity.

Clause 18: The method alone or in combination with the seventeenth clause, further comprising: deriving the key based on at least the information within the SL-MIB; and the generating comprises generating the another message authentication code based on the information within the SL-MIB and the derived key.

Clause 19: The method alone or in combination with the twelfth clause, further comprising: preconfiguring the key; and the generating comprises generating the another message authentication code based on the information within the SL-MIB and the preconfigured key.

Clause 20: The method alone or in combination with the seventeenth clause, wherein the information within the SL-MIB further indicates a geographical zone identification (ID) of the transmitter UE.

Clause 21: The method alone or in combination with the twentieth clause, further comprising: deriving the key based on at least one of: a preconfigured static base key or the geographical zone ID of the transmitter UE, using a preconfigured key derivation function; and the generating comprises generating the another message authentication code based on the information within the SL-MIB and the derived key.

Clause 22: The method alone or in combination with the twentieth clause, further comprising: determining a field coverage status of previous UEs within the geographical zone ID of the transmitter UE; and the authenticating comprises authenticating the received SL-BCH transmission, based at least on the determined field coverage status.

Clause 23: An apparatus, comprising: a memory comprising executable instructions; and a processor configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by a processor of an apparatus, cause the apparatus to perform a method in accordance with any one of Clauses 1-22.

Clause 26: A computer program product embodied on a computer-readable storage medium comprising code for performing a method in accordance with any one of Clauses 1-22.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A transmitter user equipment (UE) configured for wireless communications, comprising:
    a memory comprising instructions; and
    one or more processors configured, individually or in any combination, to execute the instructions and cause the transmitter UE to:
        generate a message authentication code, based on information within a sidelink master information block (SL-MIB) and a key shared between the transmitter UE and a receiver UE; and
        transmit a sidelink broadcast channel (SL-BCH) transmission carrying the SL-MIB and the message authentication code.

2. The transmitter UE of claim 1, wherein:
    the information within the SL-MIB indicates at least one of: common information or specific information;
    the common information indicates a carrier bandwidth; and
    the specific information indicates at least one of: a time division duplex (TDD) configuration of the transmitter UE, a frame number, a subframe number, a slot number, or an in-coverage indicator of the transmitter UE.

3. The transmitter UE of claim 2, wherein the the message authentication code is generated based on a subset of the information within the SL-MIB and the key.

4. The transmitter UE of claim 1, wherein:
    the message authentication code is generated, based on the information within the SL-MIB and the key, using a predefined function; and
    the predefined function is a one-way mapping function or a hash function.

5. The transmitter UE of claim 1, wherein the one or more processors are further configured, individually or in any combination, to execute the instructions and cause the transmitter UE to: derive the key based on at least one of:
    a type of sidelink indicator (SLI) comprising an in-coverage SLI (InC SLI) or an out of coverage SLI (OoC SLI) used by the transmitter UE; or
    a field coverage status of the transmitter UE indicating whether the transmitter UE is within or outside a coverage of a network entity.

6. The transmitter UE of claim 1, wherein the one or more processors are further configured, individually or in any combination, to execute the instructions and cause the transmitter UE to:
    preconfigure the key for generating the message authentication code; and
    use the preconfigured key for generating the message authentication code.

7. The transmitter UE of claim 1, wherein the one or more processors are further configured, individually or in any combination, to execute the instructions and cause the transmitter UE to: derive the key based on at least one of: a preconfigured static base key or a geographical zone identification (ID) of the transmitter UE, using a preconfigured key derivation function.

8. The transmitter UE of claim 7, wherein the information within the SL-MIB indicates the geographical zone ID of the transmitter UE.

9. The transmitter UE of claim 1, wherein:
    the key corresponds to a public key pair comprising a public key and a private key; and
    the one or more processors are further configured, individually or in any combination, to execute the instructions and cause the transmitter UE to transmit an indication of the public key to the receiver UE.

10. The transmitter UE of claim 9, wherein the message authentication code is generated, based on the information within the SL-MIB and the private key.

11. The transmitter UE of claim 1, wherein the one or more processors are further configured, individually or in any combination, to execute the instructions and cause the transmitter UE to transmit a certificate identification (ID) to the receiver UE.

12. A method for wireless communications by a transmitter user equipment (UE), comprising:
   generating a message authentication code, based on information within a sidelink master information block (SL-MIB) and a key shared between the transmitter UE and a receiver UE; and
   transmitting a sidelink broadcast channel (SL-BCH) transmission carrying the SL-MIB and the message authentication code.

13. The method of claim 12, wherein:
   the information within the SL-MIB indicates at least one of: common information or specific information;
   the common information indicates a carrier bandwidth; and
   the specific information indicates at least one of: a time division duplex (TDD) configuration of the transmitter UE, a frame number, a subframe number, a slot number, or an in-coverage indicator of the transmitter UE.

14. The method of claim 13, wherein the message authentication code is generated based on a subset of the information within the SL-MIB and the key.

15. The method of claim 12, wherein:
   the message authentication code is generated, based on the information within the SL-MIB and the key, using a predefined function; and
   the predefined function is a one-way mapping function or a hash function.

* * * * *